Nov. 27, 1928.
C. W. MILLARD, JR
1,692,946
AUTOMATIC AUTOMOBILE BACKSLIDE BRAKE
Filed June 16, 1927
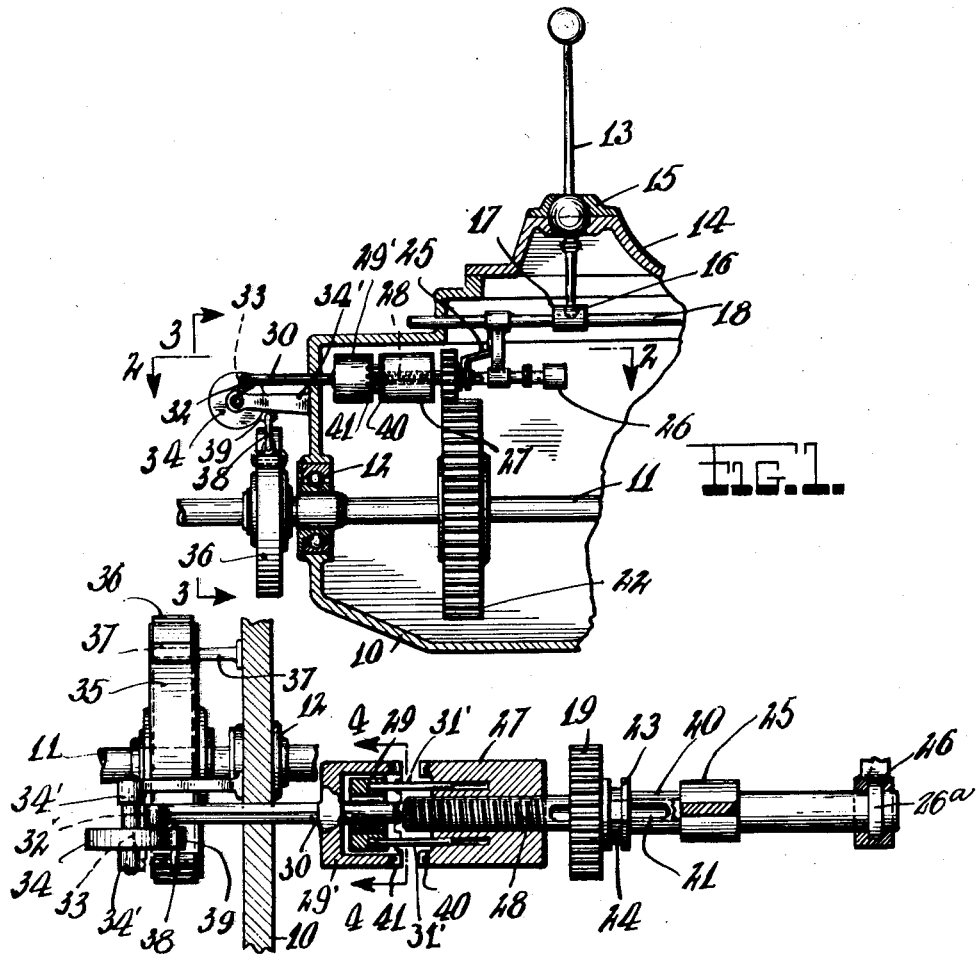
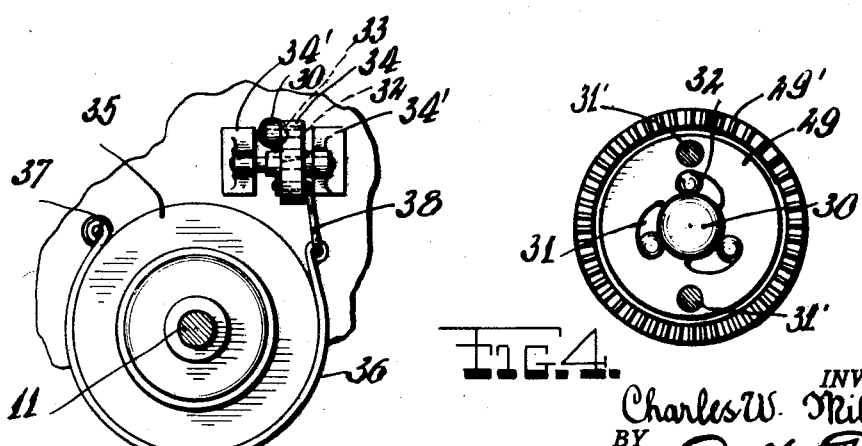

Patented Nov. 27, 1928.

1,692,946

UNITED STATES PATENT OFFICE.

CHARLES W. MILLARD, JR., OF SCARSDALE, NEW YORK.

AUTOMATIC AUTOMOBILE BACKSLIDE BRAKE.

Application filed June 16, 1927. Serial No. 199,194.

This invention relates to a new and useful device in the nature of a brake for motor vehicles, for the purpose of preventing a motor vehicle from rolling down hill backwards, the said brake being operated from the transmission of the said motor vehicle.

The object of the invention is to provide a brake of novel construction and arrangement of parts, hereinafter more fully described, claimed and illustrated in the accompanying drawing.

Fig. 1 is a vertical central fragmentary view of a motor vehicle transmission embodying my improved brake.

Fig. 2 is an enlarged sectional view taken on the line 2—2 of Fig. 1.

Fig. 3 is a similar sectional view taken on the line 3—3 of Fig. 1.

Fig. 4 is a similar sectional view taken on the line 4—4 of Fig. 2.

The transmission case 10 is of box-like construction, the main shaft 11 is rotatively mounted on the bearing 12, supported by the case 10. The main shaft 11 is connected, at its forward extremity to a clutch, and is connected, at its rear extremity to a universal joint, to which a drive shaft, or propeller shaft is connected. The latter mentioned elements are not shown in the accompanying drawing. The gear shift lever 13, is pivotally mounted in the cover 14, of the case 10, and in the socket member 15, secured to the cover 14. The lever 13 is provided with an enlarged lower extremity 15 of ball shaped construction, adapted to pivotally engage in the socket member 17, secured to the shaft 18, slidably mounted in the upper portion of the case 10.

The above described elements are those of the usual motor vehicle transmission, such as generally used in connection with motor vehicles, and the like.

As here embodied my improved brake comprises a pinion 19, slidably mounted on the shaft 20. The key 21 is secured to the shaft 20, and is adapted to engage in an elongated aperture formed in the pinion 19. The latter described construction is such as will permit the pinion 19, when engaged with the gear 22, attached to the shaft 11, to rotate or drive the shaft 20. The pinion 19 is provided with a side extended portion 23, having formed therein a coaxial groove 24, adapted to receive the fork member 25, secured to and extended from the shaft 18. The latter described construction is such as will permit the pinion 19, to be slidably engaged with the gear 22 by means of pivoting the gear shift lever 13.

The shaft 20 is rotatively mounted in the bracket element 26, extended from the sides of the case 10 and held against longitudinal motion by flange 26ª. The block member 27 is provided with a threaded axial aperture adapted to engage the threaded portion 28 of the shaft 20. The clutch member 29 is provided with an axial aperture, adapted to receive the shaft 30. The clutch member 29 has formed therein radial elongated openings 31 adapted to receive the rollers 32 of cylindrical construction. The latter described construction is such as will permit the rollers 32 to frictionally engage the shaft 30, when the clutch member 29 is rotated in a counter clockwise direction, so as to grip the said shaft, 30, and so as to permit of free rotation of the clutch member 29 in a clockwise direction.

The pins 31' are secured to the clutch member 29, and are extended therefrom, engaging in apertures formed in the block member 27. The shaft 30 is slidably mounted in the case 10, in alignment with the above mentioned shaft 20. The pin 32', is secured to the extended extremity of the shaft 30, and engages in the radial slot 33, formed in the disc member 34, rotatively mounted in the brackets 34' secured to the case 10. The brake drum 35 is secured to the above mentioned shaft 11. The brake band 36 is adapted to partially encircle the brake drum 35, and is secured, as at 37, at one extremity, by a pin or the like, carried in the case 10. The other extremity of the brake band 36 is secured to the wire 38 attached to the extended portion 39 of the disc member 34.

The above described construction is such as will permit the block member 27 when the shaft 20 is rotated in a counter-clockwise direction to travel along the threaded portion 28 of the shaft 20, the teeth 40 formed in the block member 27, engaging the teeth 41, formed in the housing member 29, integal with the shaft 30, so as to slide the said shaft, which will cause the brake band 36 to frictionally engage the brake drum 35.

It is obvious from the foregoing, that I have provided a brake which is applied by the rotation of the drive shaft of the motor vehicle, when the said motor vehicle is rolling down a hill backwards. The pinion 19 is slidably disengaged when desired, particularly when desiring to propel the said motor vehicle in a reverse or backward direction.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to protect by Letters Patent of the United States is as follows:

1. In a motor vehicle brake of the class described, a clutch member mounted on a shaft, as a means of gripping the said shaft when the clutch is rotating in one direction, and as a means of securing free rotation of the said clutch member in the opposite direction, said clutch member having secured thereto, and extended therefrom pins, adapted to engage in apertures formed in a block member, said block member threadedly mounted in a second shaft, said second shaft in alignment with the first mentioned shaft, the said second shaft rotatively mounted in the said transmission case.

2. In a motor vehicle brake of the class described, a clutch member mounted on a shaft, as a means of gripping the said shaft, when the clutch is rotating in one direction, and as a means of securing free rotation of the said clutch member in the opposite direction, said clutch member having secured thereto, and extended therefrom pins, adapted to engage in apertures formed in a block member, said block member threadedly mounted in a second shaft, said second shaft in alignment with the first mentioned shaft, the said second shaft rotatively mounted in the said transmission case, a housing member integral with the first mentioned shaft, having radial teeth adapted to engage corresponding teeth in the said block member.

In testimony whereof I have affixed my signature.

CHARLES W. MILLARD, Jr.